(12) United States Patent
Nokuo et al.

(10) Patent No.: US 7,712,354 B2
(45) Date of Patent: May 11, 2010

(54) METHOD AND APPARATUS FOR CONTROLLING Z-POSITION OF PROBE

(75) Inventors: Takeshi Nokuo, Tokyo (JP); Jun Toyaba, Saitama (JP)

(73) Assignee: Jeol Ltd., Tokyo (JP)

( * ) Notice: Subject to any disclaimer, the term of this patent is extended or adjusted under 35 U.S.C. 154(b) by 419 days.

(21) Appl. No.: 11/744,391

(22) Filed: May 4, 2007

(65) Prior Publication Data

US 2007/0277600 A1    Dec. 6, 2007

(30) Foreign Application Priority Data

Jun. 6, 2006    (JP)    ............................. 2006-157075

(51) Int. Cl.
*G01B 21/00* (2006.01)
*G01B 21/30* (2006.01)
*G01Q 10/00* (2010.01)

(52) U.S. Cl. ........................... 73/105; 73/1.79; 73/1.89; 73/866.5; 850/1; 850/19

(58) Field of Classification Search ......... 73/1.79–1.81, 73/1.89, 104–105, 866.5; 850/1–4, 19–20; 33/501

See application file for complete search history.

(56) References Cited

U.S. PATENT DOCUMENTS

| | | | | |
|---|---|---|---|---|
| 5,136,247 | A | * | 8/1992 | Hansen ..................... 324/457 |
| 6,407,546 | B1 | * | 6/2002 | Le et al. .................... 324/230 |
| 6,881,954 | B1 | * | 4/2005 | Morimoto et al. ......... 73/105 X |
| 6,960,765 | B2 | | 11/2005 | Tomimatsu et al. |
| 7,282,711 | B2 | * | 10/2007 | Winkler et al. ............. 250/310 |
| 2002/0149360 | A1 | * | 10/2002 | Le ............................. 324/230 |
| 2006/0033024 | A1 | * | 2/2006 | Sparks et al. .............. 250/306 |

* cited by examiner

*Primary Examiner*—Thomas P Noland
(74) *Attorney, Agent, or Firm*—The Webb Law Firm

(57) ABSTRACT

Method and apparatus of easily controlling the Z-position of the probe used in a microprobe analyzer. The apparatus has: (A) a holder, (B) a reference body having a reference surface that is at the same height as a surface of a sample, the reference body being placed on or in the holder, (C) a probe-positioning device for bringing the probe into contact with the reference surface, (D) a controller for controlling motion of the probe-positioning device in the Z-direction, (E) position-measuring apparatus for measuring the Z-coordinate of the probe at which it is in contact with the reference surface, (F) a memory for storing a positional coordinate outputted by the position-measuring apparatus, and (G) probe contact detection apparatus for detecting that the probe is in contact with the reference surface.

4 Claims, 3 Drawing Sheets

METHOD AND APPARATUS FOR CONTROLLING Z-POSITION OF PROBE

BACKGROUND OF THE INVENTION

1. Field of the Invention

The present invention relates to method and apparatus for controlling the Z-position of a probe used in a microprobe analyzer.

2. Description of Related Art

In some microprobe analyzers, a mechanical probe is brought into contact with the surface of a sample, and a tiny piece of the sample including a certain region of the substrate of the sample is separated and extracted using an ion beam and the probe, thus preparing the sample piece for microanalysis. Other microprobe analyzers are used to measure the characteristics of a sample while a voltage is applied to the surface of the sample with a probe. Such a microprobe analyzer is equipped with a Z-drive for bringing the probe into contact with the surface of the sample.

In a related art apparatus of this kind, information about the height of the probe from the surface of the sample is obtained based either on a secondary electron image in which a shadow produced immediately before the probe touches the sample surface is observed or on variations in the positional relationship between a probe image formed when the ion beam is made to obliquely hit the sample and an image of the sample (see, for example, JP2002-40107).

The above-described microprobe analyzer is equipped with a microscope mechanism for recognizing the portion of the sample to be observed and a portion of the sample with which the probe should be brought into contact. Since the image created by the microscope mechanism is a two-dimensional image, positions along the height cannot be recognized. Therefore, the operator causes the probe to descend toward the sample while observing the sample, thus bringing the probe into contact with the surface of the sample.

However, these manipulations impose excessive stress to the operator. Furthermore, the probe may be struck against the sample surface, damaging the probe. Such cumbersome manipulations and damage to the probe will eventually lead to a decrease in the throughput.

The probe is normally made of a hard metal, such as tungsten, and so if such a probe comes into contact with a semiconductor sample of Si or the like, a Schottky barrier is created in the probe. As a result, it becomes difficult to electrically connect the probe with the sample.

SUMMARY OF THE INVENTION

It is an object of the present invention to provide method and apparatus for controlling the Z-position of a probe more easily than heretofore.

A first embodiment of the present invention provides a method of controlling the Z-position of a probe, the method starting with providing a reference body having a reference surface that is identical in Z-position with a surface of a sample. The probe is brought close to the reference surface. The Z-coordinate of the probe at which the probe is in contact with the reference surface is stored in memory. The probe is controlled to reach the stored Z-coordinate. Under this condition, the probe is brought into contact with the surface of the sample.

A second embodiment of the present invention is based on the first embodiment and further characterized in that gold or platinum is used in or on the reference surface.

A third embodiment of the present invention is based on the first embodiment and further characterized in that a strain gauge is used to detect that the probe is in contact with the reference surface.

A fourth embodiment of the present invention is based on the first embodiment and further characterized in that the Z-position of the probe at which it is in contact with the reference surface is measured using a linear encoder.

A fifth embodiment of the present invention provides an apparatus for controlling the Z-position of a probe, the apparatus having (A) a holder, (B) a reference body having a reference surface that is identical in Z-position with a surface of a sample, the reference body being placed on or in the holder, (C) a probe-positioning device for bringing the probe into contact with the reference surface, (D) a controller for controlling motion of the probe-positioning device in the Z-direction, (E) position-measuring apparatus for measuring the Z-coordinate of the probe at which the probe is in contact with the reference surface, (F) a memory for storing a positional coordinate outputted by the position-measuring apparatus, and (G) probe contact detection apparatus for detecting that the probe is in contact with the reference surface. In order to bring the probe into contact with the surface of the sample, the probe-positioning device is moved until the Z-coordinate of the probe reaches the value stored in the memory.

(1) According to the first embodiment of the present invention, the Z-coordinate of the probe when it is in contact with the reference surface that is identical in Z-position with the surface of the sample is stored in memory. The probe is brought close to the sample to achieve the Z-coordinate. Consequently, Z-motion control provided by the microprobe analyzer can be performed more easily.

(2) According to the second embodiment of the present invention, gold or platinum is used in or on the reference surface. As a result, the reference surface is softened. If the probe comes into contact with the reference surface, damage to the probe can be prevented. Furthermore, when the probe is contacted with the reference surface, the gold or platinum adheres to the tip of the probe. Consequently, when the probe is contacted with the sample, the probe can be electrically connected with the sample.

(3) According to the third embodiment of the present invention, contact of the probe with the reference surface can be judged from the output from the strain gauge.

(4) According to the fourth embodiment of the present invention, the Z-coordinate of the probe at which it is in contact with the reference surface can be measured using the output from the linear encoder.

(5) According to the fifth embodiment of the present invention, the Z-coordinate of the probe at which it is in contact with the reference surface that is identical in Z-position with the surface of the sample is stored in memory. The probe is brought close to the sample until the stored Z-coordinate is reached. Hence, Z-motion control provided by the microprobe analyzer can be performed more easily.

Other objects and features of the invention will appear in the course of the description thereof, which follows.

DESCRIPTION OF THE PREFERRED EMBODIMENTS

Preferred embodiments of the present invention are hereinafter described in detail with reference to the drawings.

Figure 1:
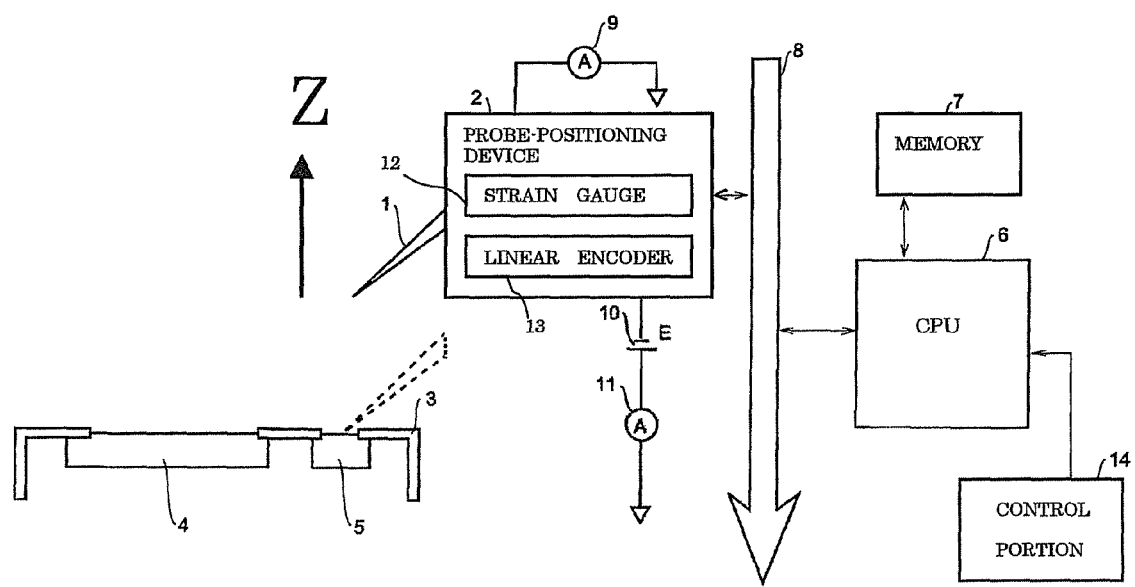
FIG. 1 is a block diagram of a microprobe analyzer according to one embodiment of the present invention.

FIG. 1 shows a microprobe analyzer according to one embodiment of the present invention. The analyzer has a probe 1, a probe-positioning device 2 to which the probe 1 is attached and which can move in three dimensions, i.e., in X-, Y-, and Z-directions, a holder 3, and a reference body 5 attached to the holder 3. A sample 4 is also attached to the holder 3. The sample 4 and reference body 5 are attached to the holder 3 in such a way that the upper surface of the sample 4 is flush with the surface (reference surface) of the reference body 5. At least the reference surface of the reference body 5 is made of gold or platinum.

The probe analyzer further includes a CPU (central processing unit) 6 for controlling the operation of the whole apparatus. A memory 7 is connected with the CPU and stores necessary data. A bus 8 interconnects the probe-positioning device 2 and the CPU 6.

The analyzer further includes an ammeter 9 for measuring an electrical current flowing in via the probe 1, a voltage power supply 10, and another ammeter 11 for measuring an electrical current flowing into the voltage power supply 10.

A strain gauge 12 is mounted within the probe-positioning device 2 and used to detect that the probe 1 is in contact with the reference surface of the reference body 5. A linear encoder 13 that is mounted within the probe-positioning device 2 in the same way as the strain gauge is used to recognize the absolute position of the probe 1 in the Z-direction.

A control portion 14 for entering various commands is connected with the CPU 6. A coordinate input device, such as a keyboard or a computer mouse, is used as the control portion 14. The operation of the apparatus constructed as described so far is described below.

The probe 1 can be placed in position in the X- and Y-directions while the operator is making an observation with a microscope. However, positions in the Z-direction (along the height) cannot be grasped accurately, because any coordinate system providing a basis cannot be defined.

Accordingly, the tip of the probe 1 is once brought into contact with the reference surface of the reference body 5 by a manual operation. In particular, when the operator supplies a control signal for Z-motion from the control portion 14 to the CPU 6, the CPU sends a driving signal to the probe-positioning device 2 via the bus 8. The probe-positioning device moves in steps in the Z-direction.

The probe 1 moves downward in the Z-direction in this way. When the tip of the probe 1 touches the reference surface, the output from the strain gauge 12 varies. The output from the strain gauge is sent to the CPU 6 via the bus 8.

When the CPU 6 recognizes from the output from the strain gauge 12 that the probe 1 is in contact with the reference surface, the CPU receives the present output from the linear encoder 13 indicative of the Z-coordinate of the probe 1 via the bus 8 and stores the Z-coordinate in the memory 7. The stored value is used as a reference value. At the same time, Z-motion of the probe-positioning device 2 is stopped.

Then, the operator sends a control signal to the probe-positioning device 2 via the CPU 6 from the control portion 14 to move the probe-positioning device such that the probe 1 is spaced a given distance from the reference surface.

Under this condition, the operator supplies a start signal to the CPU 6 from the control portion 14. The CPU sends a control signal to the probe-positioning device 2 via the bus 8. Then, the probe-positioning device begins to operate to bring the probe 1 into a desired position on the sample 4.

Since the position of the probe 1 in the X- and Y-directions can be recognized from the XY coordinate system on the image on the microscope (not shown), the probe 1 can be moved into a desired position in the X- and Y-directions.

When the probe 1 placed above the target position on the surface of the sample 4 is moved downward in the Z-direction, the CPU 6 reads the reference value from the memory 7. The CPU compares the present value of the Z-coordinate sent in from the linear encoder 13 via the bus 8 with the reference value read out to thereby calculate the distance between the tip of the probe 1 and the surface of the sample 4.

The CPU 6 supplies the calculated value to the probe-positioning device 2 via the bus 8. The probe-positioning device descends a distance based on the calculated value in the Z-direction. As a result, the tip of the probe 1 reaches the target position on the surface of the sample 4.

In this way, according to the present invention, the Z-coordinate at which the tip of the probe 1 touches the reference surface that is identical in Z-position with the surface of the sample is stored in memory. The probe 1 is brought close to the surface of the sample such that the stored Z-coordinate is reached. Consequently, Z-motion control provided by the microprobe analyzer can be performed more easily.

Furthermore, according to the present invention, at least the reference surface of the reference body 5 is made of a noble metal (such as gold or platinum) that does not induce interaction with gaseous molecules. For example, the noble metal is deposited on the reference surface of the reference body 5 by vapor deposition. Therefore, when the probe 1 is contacted with the reference surface, factors (such as dust and contaminants) which increase the contact resistance can be removed.

In addition, the reference surface is soft, because the reference surface is made of a noble metal in this way. Therefore, if the probe strikes the reference surface, damage to the probe can be prevented.

Moreover, when the probe is contacted with the reference surface, the noble metal adheres to the tip of the probe and so when the probe is contacted with the sample, the probe can be electrically connected with the sample.

Figure 2A:
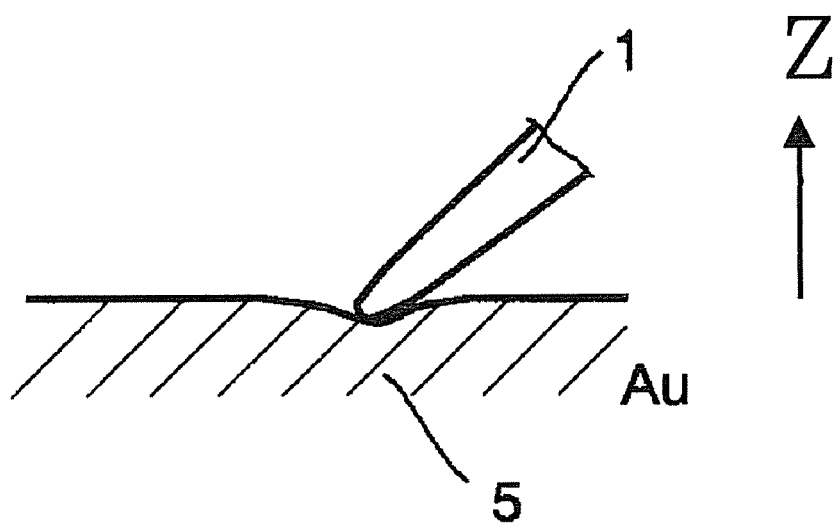
FIGS. 2(*a*) and 2(*b*) are cross sections showing the manner in which the probe shown in FIG. 1 comes into contact with a reference surface and with the surface of a sample.
Figure 2B:
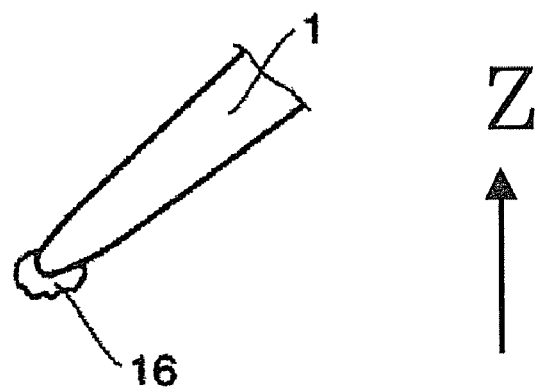
Figure 2B:
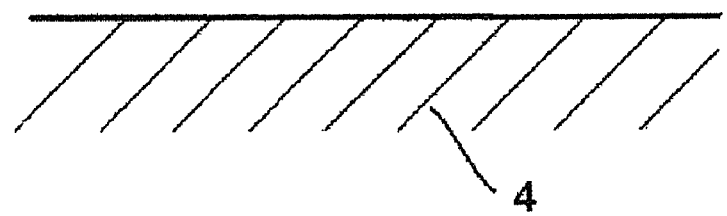

FIG. 2(a) shows the manner in which the probe 1 comes into contact with the reference surface. FIG. 2(a) shows the state in which the tip of the probe 1 is in contact with the reference surface, while FIG. 2(b) shows the state in which the probe 1 is spaced from the reference surface and is descending toward the sample 4.

When the tip of the probe 1 is contacted with the reference surface as shown in FIG. 2(a), the film of gold (Au) formed on the reference surface peels off the reference surface and adheres to the surface of the probe 1 because the surface of the probe is rough. A film of gold 16 is formed around the tip of the probe 1.

If a noble metal, such as gold or platinum, touches Si, no Schottky barrier is formed. Therefore, electrical connection with the sample made of Si or the like can be made.

The voltage power supply 10 and ammeters 11, 9 of FIG. 1 are used when the characteristics of the sample 4 are examined in practice. The characteristics of the sample 4 can be measured by measuring either the electrical current flowing into the probe 1 when it comes into contact with the sample 4 or the electrical current flowing through the probe when a voltage is applied to the sample 4 via the probe 1.

In the above embodiment, a strain gauge is used as the probe contact detection apparatus. The present invention is not limited to this. The following means may also be used.

(1) Tunneling Current Detection Means

A bias voltage is applied between the sample and the probe. A tunneling current flowing when the probe is brought close to the sample is measured. Contact of the probe with the sample is detected.

(2) Capacitance Detection Means

A coil having an inductance of L, a capacitor having a capacitance of C, and a resistor having a resistance of R are connected in series between the probe and the sample. An AC voltage is applied to this series connection. The resulting resonant frequency is measured. Thus, contact of the probe with the sample is detected. When the probe is contacted with the sample, an AC current flows through this circuit, maximizing the resonant frequency.

In the above embodiment, a linear encoder is used as the position-measuring apparatus for measuring the Z-coordinate of the probe at which it is in contact with the reference surface of the reference body 5. The present invention is not limited to this. The following means may also be used.

(1) Optical Detection Means

A laser light source is placed in a stationary reference position relative to a moving object. Laser light is shot at the moving object. A reflective mirror is mounted on the moving object. Reflected laser light is detected. When the moving object is in motion, the optical path difference varies. The resulting interference distance is analyzed, and the absolute position is identified.

(2) Resistance Detection Means

The position is identified by bringing a detection terminal into contact with a resistor having a certain distance (length) and detecting the resistance between one terminal of the resistor and the detection terminal. Since the resistance is in proportion to the length, the position can be identified.

(3) Capacitance Detection Means

Where two objects are close to each other, a capacitance C produced between them is in proportion to S/D, where S is the area and D is the distance between the objects. Therefore, the capacitance C varies with varying the distance D. The distance D between the objects can be found by measuring the capacitance C between the objects.

Furthermore, in the above embodiment, the sample 4 and the reference body 5 are mounted to the holder 3 such that the surface of the sample 4 and the reference surface of the reference body 5 are at the same height in the Z-direction. The present invention is not limited to this structure. For example, a structure as shown in FIG. 3 may also be adopted.

Figure 3:
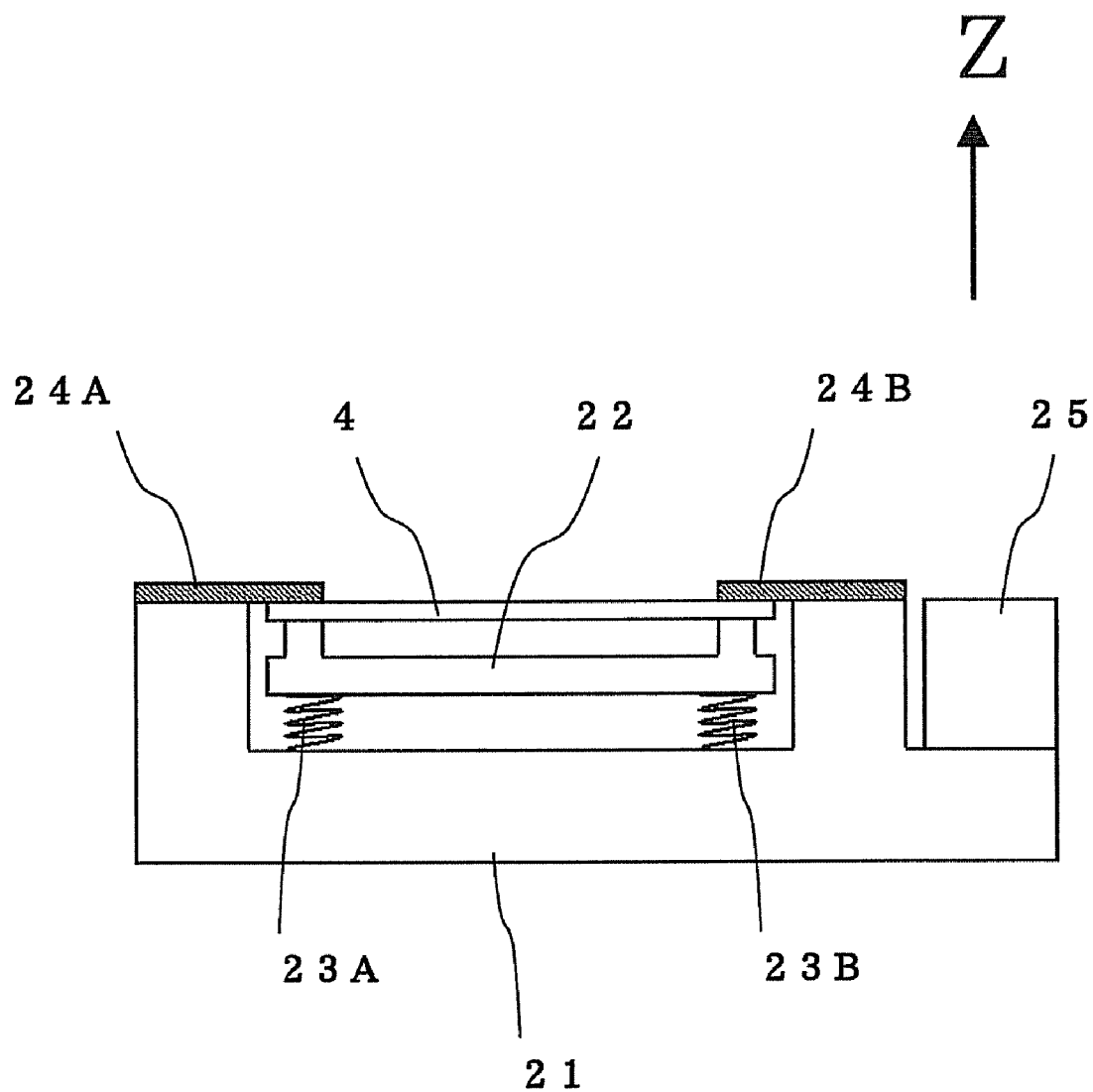
FIG. 3 is a vertical cross-sectional view of a holder according to one embodiment of the present invention.

Referring next to FIG. 3, a holder 21 of U-shaped cross section has a recessed portion. A sample stage 22 is disposed on the bottom surface of the recessed portion via springs 23A and 23B. Upper surface-limiting plates 24A and 24B are mounted to the upper surface of the holder 21. A reference body 25 in the form of a rectangular parallelepiped or cube is mounted to a jaw portion located outside the recessed portion of the holder 21. The reference body is so dimensioned that when it is mounted to the holder 21, the upper surface of the reference body as viewed in the Z-direction is flush with the lower surfaces of the upper surface-limiting plates 24A and 24B.

When the sample stage 22 has been drawn downward, the sample 4 is set between the stage 22 and the upper surface-limiting plates 24A and 24B. After the sample has been set, the sample stage 22 is ceased to be drawn. As a result, the surface of the sample 4 is limited by the upper surface-limiting plates 24A and 24B. Under this condition, the surface of the sample 4 agrees with the Z-position of the reference surface of the reference body 25.

The advantages of the present invention described so far are listed below.

(1) The reference point of the probe in the Z-direction is taken at the surface of the sample. This facilitates setting the probe at the reference point. This can alleviate the burden on the operator.

(2) As the controllability is improved, the throughput is improved.

(3) It is easy to make a contact with a polysilicon part. Normally, it is difficult to make an electrical connection with such a polysilicon part.

In this way, according to the present invention, method and apparatus capable of controlling the Z-position of a probe more easily than heretofore can be offered, the probe being used in a microprobe analyzer.

Having thus described our invention with the detail and particularity required by the Patent Laws, what is desired protected by Letters Patent is set forth in the following claims.

The invention claimed is:

1. A method of controlling a Z-position of a probe, said method comprising the steps of:
   providing a reference body having a reference surface that is identical in Z-position with a surface of a sample;
   bringing the probe close to the reference surface;
   storing a Z-coordinate of the probe at which the probe is in contact with the reference surface into memory;
   controlling the probe such that it reaches the stored Z-coordinate; and
   bringing the probe into contact with the surface of the sample.

2. A method of controlling a Z-position of a probe as set forth in claim 1, wherein gold or platinum is used in or on said reference surface.

3. A method of controlling a Z-position of a probe as set forth in claim 1, wherein a strain gauge is used to detect that said probe is in contact with said reference surface.

4. A method of controlling a Z-position of a probe as set forth in claim 1, wherein the Z-coordinate of the probe at which the probe is in contact with the reference surface is measured using a linear encoder.

* * * * *